A. F. ZAHM.
AILERON.
APPLICATION FILED SEPT. 18, 1915.
1,223,017.
Patented Apr. 17, 1917.
4 SHEETS—SHEET 1.
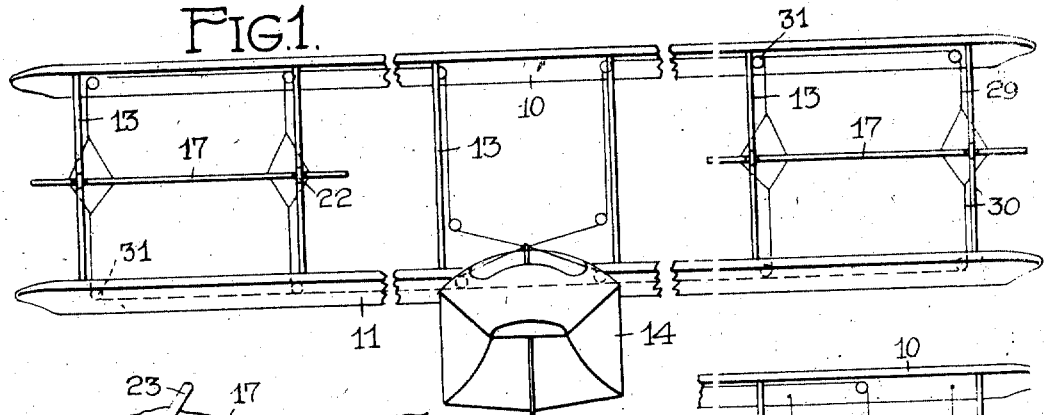
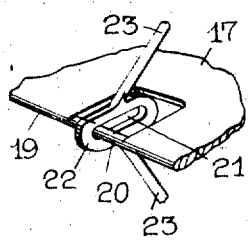
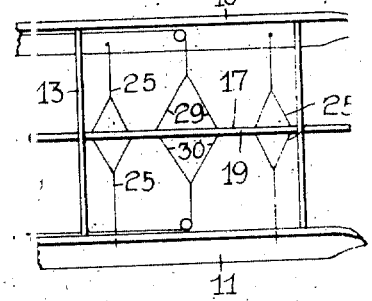
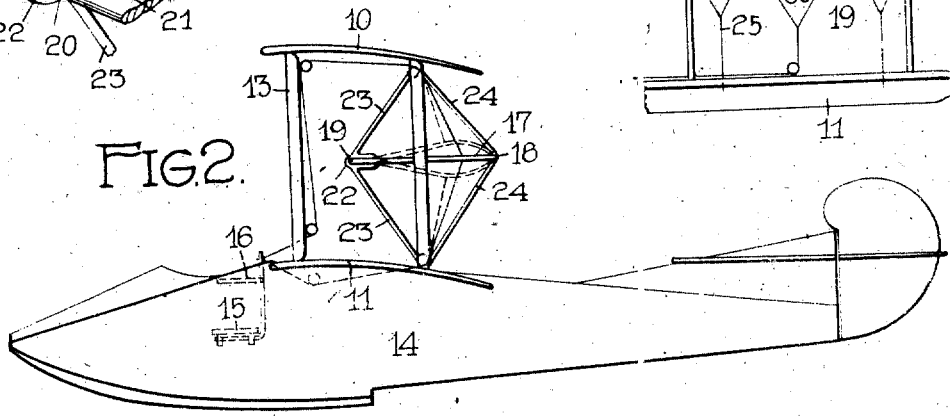
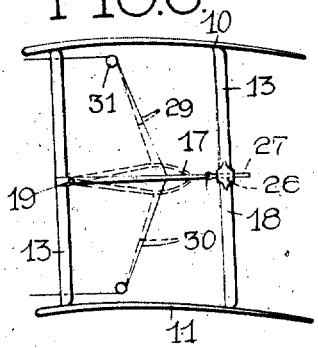
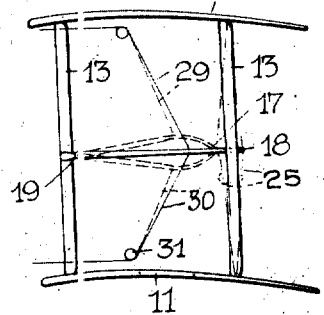
Inventor
Albert F. Zahm
by John P. Earley
Attorney.

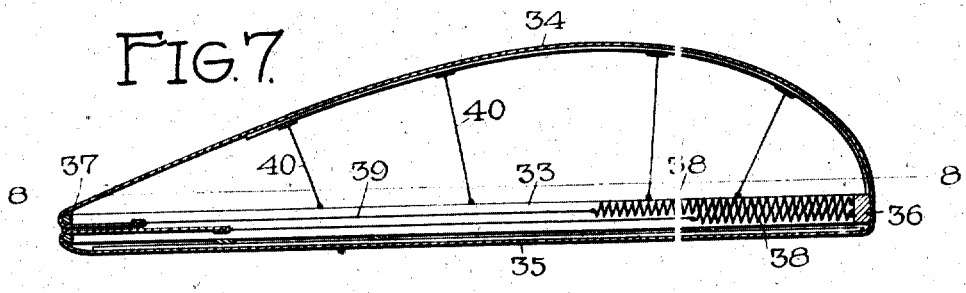
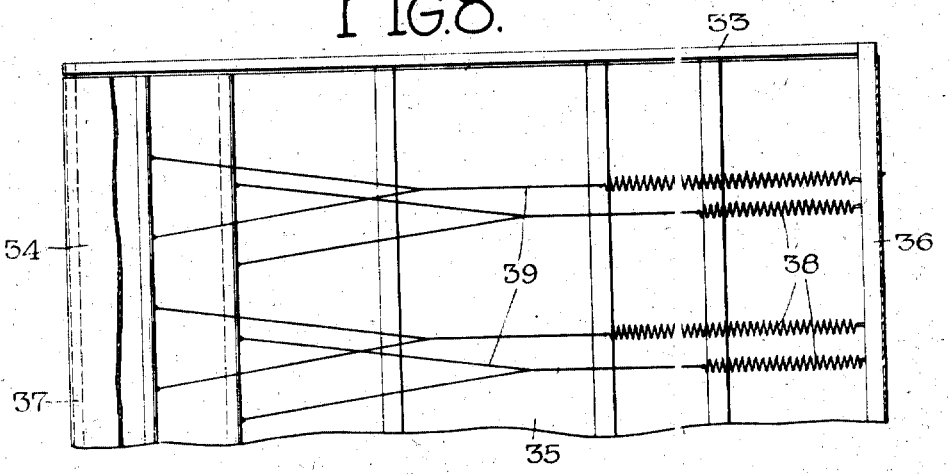
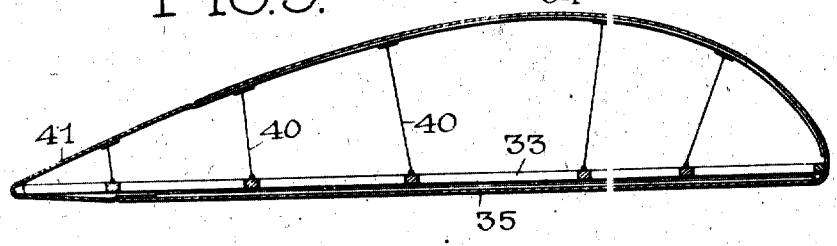

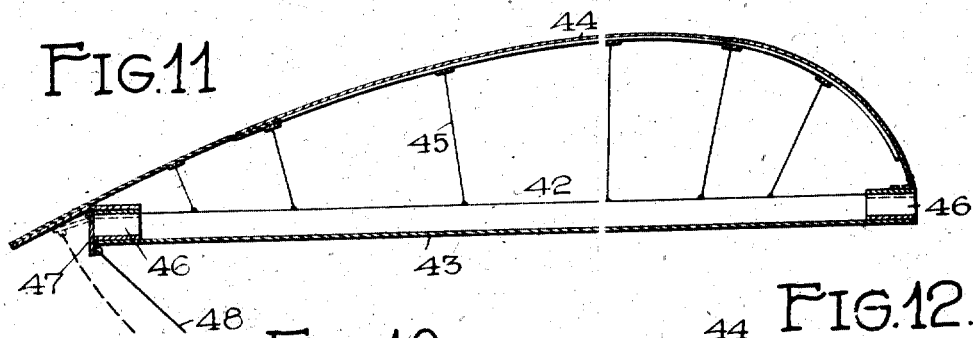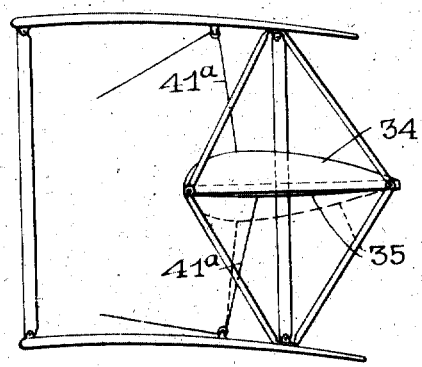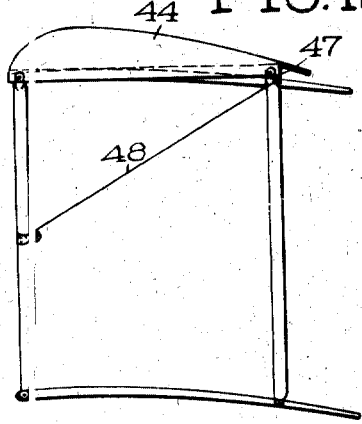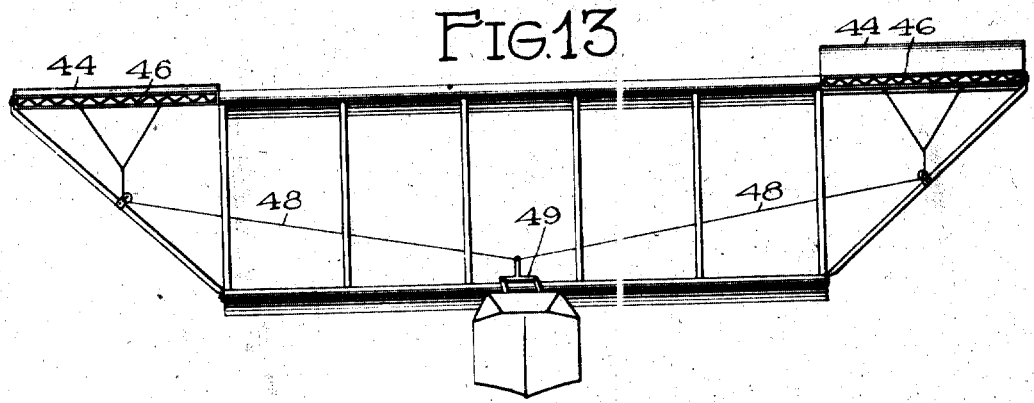

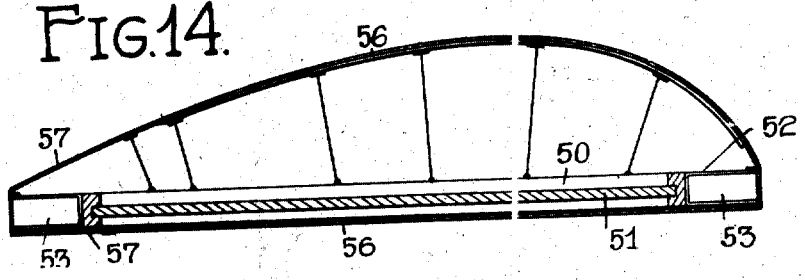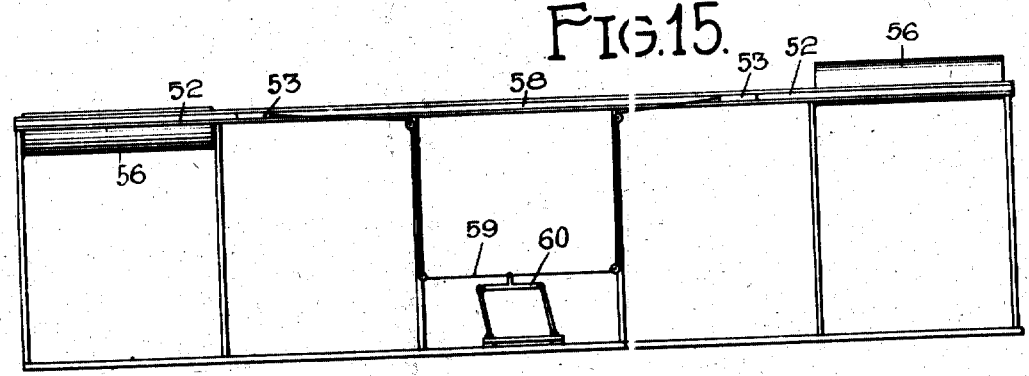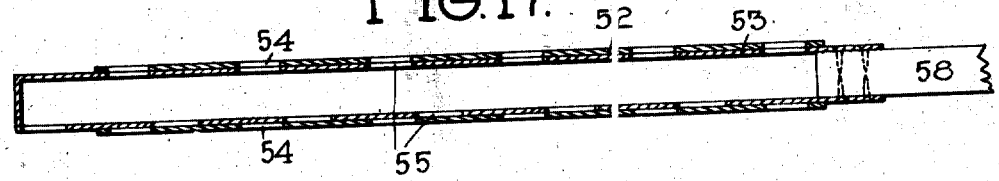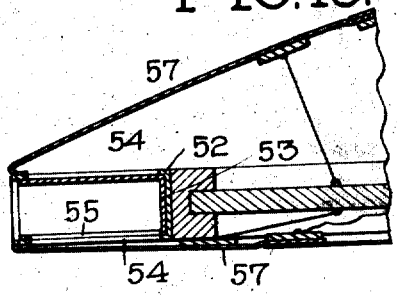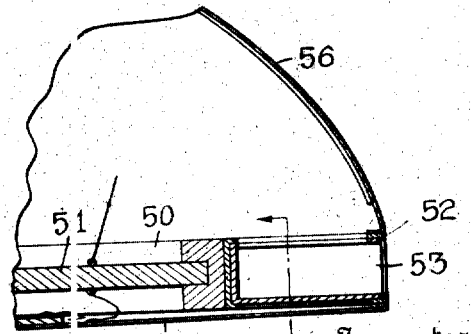

UNITED STATES PATENT OFFICE.

ALBERT F. ZAHM, OF BUFFALO, NEW YORK.

AILERON.

1,223,017.  Specification of Letters Patent.  Patented Apr. 17, 1917.

Original application filed March 26, 1914, Serial No. 827,485. Divided and this application filed September 18, 1915. Serial No. 51,424.

*To all whom it may concern:*

Be it known that I, ALBERT F. ZAHM, a citizen of the United States, residing at Buffalo, in the county of Erie and State of New York, have invented certain new and useful Improvements in Ailerons, of which the following is a specification.

This invention relates to flying machines, and more particularly relates to that class of such machines which are equipped with means enabling the pilot to vary the useful wind force on sustaining surfaces of the machine without changing the angles of incidence of the surfaces.

The present application is to be considered as divided out from the original application filed March 26, 1914 and accorded Serial No. 827,485, and may be considered as covering such part of the subject matter of the mentioned original application as relates to the variation of the useful wind force by altering the camber of an aileron.

As a principal object accordingly, it is contemplated by this invention to provide an aerofoil structure which will permit alteration of the camber of an aileron, wing, rudder or other aerofoil without changing its angle of incidence in varying the sustaining power of the air for a flying machine of the heavier-than-air type.

More specifically, it is designed by this invention to provide a stabilizing plane or aileron which is normally to have neutral placement between the main planes of the machine, but which may be distorted in either vertical direction for the purpose of assuming a temporary camber to effect the desired stabilizing result.

A further object of the invention is to provide ailerons, the camber of which may be temporarily changed by the admission of air thereinto, such ailerons being of the inflatable variety; and an added object is to equip a distortable aileron with means of resilient character permitting the automatic return of the aileron to its normal position after the distorting strain is removed.

The above and additional objects which will be hereinafter treated in detail, are accomplished by such means as are illustrated in the accompanying drawings, described in the following specification, and then more particularly pointed out in the claims which are appended hereto to form a part of this divisional application.

With reference to the drawings wherein there are illustrated the preferred embodiments of this invention as it is reduced to practice, and throughout the several views of which like characters of reference denote similar parts, Figure 1 is a front elevation of a heavier-than-air flying machine equipped with the camber-varying, stabilizing aileron of this invention, Fig. 2 is a view of the same subject matter but in side elevation, Fig. 3 is a perspective detail of one form of aileron support permitting a fore-and-aft adjustment, Fig. 4 is a fragmentary elevational detail showing a flexible support for the aileron, Fig. 5 is another view of the same subject but is taken at right angles to Fig. 4, Fig. 6, shows still another form capable of accomplishing the objects of this invention, Fig. 7 illustrates an expansible aileron fitted with springs normally maintaining it in a neutral position, Fig. 8 is a sectional view of the same subject matter on the line 8—8 of Fig. 7.

Fig. 9 is a longitudinal sectional view of an expansible aileron fitted with a resilient fabric strip to replace the springs of the preceding modification, Fig. 10 is a side elevation of an aeroplane equipped with the aileron shown in the last three described figures, Fig. 11 is a longitudinal sectional view taken through an inflatable aileron, Fig. 12 shows an alternative manner of positioning the inflatable aileron, Fig. 13 is a front elevation of an aircraft fitted with the aileron of this modification in the manner shown in Fig. 12, Fig. 14 is a longitudinal sectional view of an aileron which is inflated and fitted with suitable air inlet control means, Fig. 15 is a front elevation of an aeroplane showing the method of controlling ailerons on the opposite wing surfaces simultaneously, Fig. 16 is an enlarged sectional view showing fragmentarily the inflatable aileron of Fig. 14, and Fig. 17 is a transverse sectional view taken through the air inlet control on the line 17—17 of Fig. 16.

An aeroplane of the type known as the "flying boat" is shown in Fig. 1 as being equipped with one form of the stabilizing aileron of the present invention. The main planes of the flying machine are designated 10 and 11 respectively and are connected by posts 13 to form the aeroplane structure as differentiated from the float or boat structure denoted by the numeral 14. A pilot seat 15 is provided in the forward cockpit of the boat structure, such seat being fitted with some form of mechanical control means 16 for the adjustable aileron, the controlling means here illustrated being of the well known Curtiss shoulder-fork type.

The ailerons to be controlled are numbered 17, and comprise each a plane having a substantially rigid rear edge 18, and a forward edge 19 loosely mounted by an uncovered portion of the aileron frame bar 20 within the elongated slot 21 of a bracket arm 22 which is formed at the juncture of frame arms 23, converging to an intersection from respective main planes 10 and 11. Frame pieces 24 are similarly carried by the main planes for the rigid support of the rear edge 18.

The foregoing applies to the aileron structure illustrated in Figs. 1, 2, and 3, yet other methods of supporting each aileron are contemplated and included in this present invention. Figs. 4 and 5 illustrate for instance, a method of mounting these stabilizing planes which employs the flexible elements 25 for the purpose of loosely sustaining the rear edge of the aileron between the main planes, while the forward edge is to be secured to the forward frame posts connecting the main planes. In this construction the flexible elements 25 permit the same degree of lateral play afforded in the first disclosed construction by the slotted bracket 22. The third form is shown in Fig. 6 and will be seen to differ from those forms already set forth by the employment of a bolt 27 for slidable engagement with a bracket 28 carried by a rearward frame post 13, the forward frame post serving to mount the forward edge of the aileron.

In each of these three forms, whether the ailerons 17 are supported clear of the plane connecting posts 13, whether they are partially supported by said posts, as in the second form, or wholly supported thereby as last disclosed, the method of controlling such ailerons remains identically the same. Opposite flexible control leads 29 and 30 are connected to the substantially central portion of each aileron 17, and are then led over the pulleys 31 until they can be brought forward for connection to the arms of the shoulder-fork 16, so that the movement of the latter will cause the desired flexing of the normally neutral aileron in order to cause the desired alteration of camber.

The operation of this type of control is as follows: Assuming the aeroplane to be flying in a horizontal plane, the ailerons 17 will lie flat in that plane, in a relatively neutral position with reference to the main planes of the machine. When desired or necessary to lift or depress either side, however, the ailerons are flexed in opposite directions by moving the shoulder-fork in the direction toward which it is desired to turn, or in the case of balancing, toward the high side of the machine. The effect thus produced is due entirely to a change of camber and the direction of flexing of the two ailerons. Within limits, the greater the degree of flexing or the greater the arching of the surface, the greater the lifting or depressing effect, and this of course will be exercised upwardly on that side in which the aileron is flexed upwardly and downwardly on the other side. It should be understood that while I have shown these two ailerons connected and simultaneously operated, such operation is by no means necessary but on the contrary they may be operated singly and in only one direction if desired. In fact, as long as an angle of incidence is maintained constant and is fixed with reference to the main planes for proper horizontal flight, I may use either lifting or depressing ailerons when operating only one at a time and depending upon the difference in other lifting power for the unbalancing or counterbalancing effect. In this case, one-half of the cords shown in the figures would be omitted, and the control of the shoulder-fork would be unidirectional on each aileron.

Figs. 7 and 8 show a modification of the distortable diaphragm aileron in which the same general principle is employed for the production of changes in lifting power by flexing or altering the camber of an aerofoil having a fixed angle of incidence. Referring to these figures the numeral 33 designates the rectangular rigid frame which is supported by any suitable means, such as illustrated in Figs. 1 and 2, and having secured to its opposite faces the flexible skins 34 and 35. These skins are preferably constructed of fabric in a manner well understood in this art, although the material and manner of making up the same may obviously be varied in accordance with convenience or necessity.

Along the forward edge 36 of the frame 33 each of the skins 34 and 35 are permanently fastened, while the opposite end of each skin is trained over the corresponding bar 37 carried at the other extremity of the frame 33. Resilient means, in this case contractile coil springs designated 38, are secured to the forward edge 36 of the aileron frame, and are flexibly connected by cords 39 with the ends of respective skins 34 and 35 and each slidably trained over the bars 37. Stop-cords 40 are spaced along the outlines of each skin for flexible connection to the frame 33, in order to limit the shape of the aileron to the desired stream-line form.

The form of an expansible aileron shown in Fig. 9, is similar to that described in the immediate foregoing, with the exception that a strip of elastic 41 connects the two separate skins 34 and 35 thus obviating any need for the employment of the separate springs 38 of the first described modification. In each case control of the aileron is accomplished through the medium of the usual connections 41ª with each of the skins 34 and 35, as illustrated to advantage in Fig. 10, for the distortion from its normal position of either of the skins of an aileron which will accomplish a desired alteration in the camber therefor without change in the angle of incidence.

In the construction illustrated in Figs. 11 to 13 inclusive, the resilient mounting of separable aileron skins is replaced by means for inflating the stabilizing device for the purpose of altering its camber. To this end the rectangular frame 42 supports on one of its edges the bottom sheathing 43, and has secured to the top thereof the inflatable aileron skin 44 through the medium of stop-cords 45 which limit the expanded aileron shape in the obvious manner. The forward and rear ends of the frame 42 are transverse corrugated plates 46 which are so designed as to permit the passage of air between the interior of the aileron and the exterior atmosphere. Over the rearward plate 46 there is the hinged flap-valve 47 which is operable from the pilot seat through a suitable connection 48. Normally, during the flight of the machine, and when it is not desired to inflate the aileron skin 44, the valve 47 is permitted to remain open so that the air forced in the forward corrugated plate by the progress of the machine is permitted to escape through the rearward plate 46 without causing inflation of the aileron 44. The closing of the valve 47, in the manner indicated in Fig. 11, will be attended by an inflation of the aileron 44, since entering air can find no outlet. Various degrees of inflation can be secured by proper manipulation of this valve, control for the valves being illustrated in Fig. 13 and adapted to the well known Curtiss shoulder-fork movement designated by the numeral 49.

Still another form of inflatable aerofoil is shown in Fig. 14 where the framework of the aileron denoted by the numeral 50 has set thereinto the rigid bottom 51, similar to the sheathing 43 of the aileron shown in Fig. 11. In this instance, however, the valves at the forward and rear edges of the frame 50 include casings 52 secured directly to the aileron frame, and having sliding therein the hollow valved members 53. The containing casing is provided on each of its upper and lower faces with registry ports 54 while the valve member has similar ports 55 on each of its faces, although the ports of each face are staggered with respect to those of the other face. This construction permits the registration of the valve ports 55 with the casing ports 54 to but one face of the casing at a time. Expansible aerofoil skins 56 are secured on the upper and lower faces of the frame 50, being provided with an elastic gusset 57 at one edge of their attachment. The sliding valves 53 of ailerons carried at the extremities of the aeroplane supporting surfaces are connected through the medium of the bar 58. In this manner operating one of the ailerons to cause an expansion, or camber alteration of the lower half thereof causes an opposite expansion of the other aileron, owing to the single acting flexible connections 59 with the operating shoulder-fork or similar device 60, the fork leaning in the direction of the depressing aileron and away from the elevating aileron.

In reading and construing the foregoing specification and the appended claims, it is to be understood, first, that many non-essential changes in matters of detail may be made, including both additions and subtractions of apparatus and elements, without departing from the spirit of my invention; and second, that the use of this invention is not limited to what I may term balancing control alone, but may be employed wherever it is desired to vary the wind force at an angle to the direction of the air rush in flight without varying the angle of incidence. For example, the diverse forms of ailerons and control surfaces which I have disclosed herein may some or all of them be readily adapted for use as elevators, vertical or horizontal rudders. The entire invention, or any part of it, may also be applied to lighter-than-air machines if desired, as well as to the heavier-than-air type specifically described herein. Such variations and applications of my invention are fully contemplated by me and are intended to be covered hereby and included in so far as they fall fairly within the scope of my claims.

For clarity, several expressions employed throughout the foregoing specification and to be introduced also into the claims will be defined as follows:

By "angle of incidence", as used herein, is meant the angle between the chord of the surface and the direction of translation through the air.

By "camber", as applied to an aileron or wind surface, is meant the ratio of the greatest depth of arch of either a convex or concave surface to the length of the chord.

By "placement" of one surface with respect to another, the position of that surface is meant, particularly as regards the reciprocal wind effect of the surface upon each other.

What I claim is:

1. In a flying machine, the combination with the main planes of the machine, of an aileron normally neutral as to its placement with respect to said main planes, and means to distort said aileron from its neutral placement without altering the angle of incidence thereof.

2. In a flying machine, the combination with the main planes of the machine, of an aileron normally neutral as to its placement with respect to said main planes, and means to change the neutral placement of the aileron by mechanically controlled alteration of the camber without altering the angle of incidence thereof.

3. In a flying machine, the combination with the main planes of the machine, of an aileron normally neutral as to its placement with respect to said main planes, and means acting on the center of the aileron to cause the fore-and-aft edges thereof to approach in altering the neutral placement of the aileron without altering the angle of incidence thereof.

4. In a flying machine, the combination with the main planes of the machine, of an aileron normally neutral as to its placement with respect to said main planes, and means flexibly connecting with the aileron to cause vertical distortion thereof in either direction from its neutral placement without altering the angle of incidence thereof.

5. In a flying machine, the combination with the main planes of the machine, of an aileron normally neutral as to its placement with respect to said main planes, and means flexibly connecting with the aileron to alter the camber thereof in either vertical direction from its neutral placement without altering the angle of incidence thereof.

6. In a flying machine, the combination with the main planes of the machine, of an aileron normally neutral as to its placement with respect to said main planes, and means flexibly connecting with the aileron to cause, by a pull in either vertical direction, the fore and aft edges of the aileron to approach in altering the neutral placement thereof without altering the angle of incidence thereof.

7. In a flying machine, the combination with the main planes of the machine, of an aileron normally neutral as to its placement with respect to said main planes, means substantially rigidly supporting one edge of said aileron, means movably supporting the other edge of said aileron, and means to distort said aileron from its neutral placement without altering the angle of incidence thereof.

8. In a flying machine, the combination with the main planes of the machine, of an aileron normally neutral as to its placement with respect to said main planes, means substantially rigidly supporting one edge of said aileron, means movably supporting the other edge of said aileron, and means to alter the neutral placement of the aileron by mechanically controlled alteration of the camber without altering the angle of incidence thereof.

9. In a flying machine, the combination with the main planes of the machine, of an aileron normally neutral as to its placement with respect to said main planes, means substantially rigidly supporting one edge of said aileron, means slidably supporting the other edge of said aileron, and means acting on the center of the aileron to cause the fore and aft edges thereof to approach in altering the neutral placement of the aileron without altering the angle of incidence thereof.

10. In a flying machine, the combination with the main planes of the machine, of an aileron normally neutral as to its placement with respect to said main planes, means substantially rigidly supporting one edge of said aileron, means slidably supporting the other edge of said aileron, and means flexibly connecting with the aileron to cause vertical distortion thereof in either direction from its neutral placement without altering the angle of incidence thereof.

11. In a flying machine, the combination with the main planes of the machine, of an aileron normally neutral as to its placement with respect to said main planes, means substantially rigidly supporting one edge of said aileron, means slidably supporting the other edge of said aileron, and means flexibly connecting with the aileron to alter the camber thereof in either vertical direction from its neutral placement without altering the angle of incidence thereof.

12. In a flying machine, the combination with the main planes of the machine, of an aileron normally neutral as to its placement with respect to said main planes, means substantially rigidly supporting one edge of said aileron, means slidably supporting the other edge of said aileron, and means flexibly connecting with the aileron to cause, by a pull in either vertical direction, the fore-and-aft edges of the aileron to approach in altering the neutral placement thereof without altering the angle of incidence thereof.

13. In a flying machine, the combination with the main planes of the machine, of an aileron normally neutral as to its placement with respect to said main planes, means substantially rigidly supporting one edge of said aileron, means extending between said main planes to flexibly support the other edge of said aileron for fore-and-aft movement, and means to distort said aileron from its neutral placement without altering the angle of incidence thereof.

14. In a flying machine, the combination with the main planes of the machine, of an aileron normally neutral as to its placement with respect to said main planes, means substantially rigidly supporting one edge of said aileron, means extending between said main planes to flexibly support the other edge of said aileron for fore-and-aft movement, and means to alter the neutral placement of the aileron by mechanically controlled alteration of the camber without altering the angle of incidence thereof.

15. In a flying machine, the combination with the main planes of the machine, of an aileron normally neutral as to its placement with respect to said main planes, means substantially rigidly supporting one edge of said aileron, means extending between said main planes to flexibly support the other edge of said aileron for fore-and-aft movement, and means acting on the center of the aileron to cause the fore-and-aft edges thereof to approach in altering the neutral placement of the aileron without altering the angle of incidence thereof.

16. In a flying machine, the combination with the main planes of the machine, of an aileron normally neutral as to its placement with respect to said main planes, means substantially rigidly supporting one edge of said aileron, means extending between said main planes to flexibly support the other edge of said aileron for fore-and-aft movement, and means flexibly connecting with the aileron to cause vertical distortion thereof in either direction from its neutral placement without altering the angle of incidence thereof.

17. In a flying machine, the combination with the main planes of the machine, of an aileron normally neutral as to its placement with respect to said main planes, means substantially rigidly supporting one edge of said aileron, means extending between said main planes to flexibly support the other edge of said aileron for fore-and-aft movement, and means flexibly connecting with the aileron to alter the camber thereof in either vertical direction from its neutral placement without altering the angle of incidence thereof.

18. In a flying machine, the combination with the main planes of the machine, of an aileron normally neutral as to its placement with respect to said main planes, means substantially rigidly supporting one edge of said aileron, means extending between said main planes to flexibly support the other edge of said aileron for fore-and-aft movement, and means flexibly connecting with the aileron to cause, by a pull in either vertical direction, the fore-and-aft edges of the aileron to approach in altering the neutral placement thereof without altering the angle of incidence thereof.

19. In a flying machine, the combination with the main planes of the machine, of an aileron normally neutral as to its placement with respect to said main planes, frame pieces situated between the main planes of the machine supporting the opposite edges of said aileron, one of said frame pieces being formed with means movably accommodating the edge supported thereby, and means to distort said aileron from its neutral placement without altering the angle of incidence thereof 20. In a flying machine, the combination with the main planes of the machine, of an aileron normally neutral as to its placement with respect to said main planes, frame pieces situated between the main planes of the machine supporting the opposite edges of said aileron, one of said frame pieces being formed with means movably accommodating the edge supported thereby, and means to alter the neutral placement of the aileron by mechanically controlled alteration of the camber, without altering the angle of incidence thereof.

21. In a flying machine, the combination with the main planes of the machine, of an aileron normally neutral as to its placement with respect to said main planes, frame pieces situated between the main planes of the machine supporting the opposite edges of said aileron, one of said frame pieces being formed with means slidably accommodating the edge supported thereby, and means acting on the center of the aileron to cause the fore-and-aft edges thereof to approach in altering the neutral placement of the aileron without altering the angle of incidence thereof.

22. In a flying machine, the combination with the main planes of the machine, of an aileron normally neutral as to its placement with respect to said main planes, frame pieces situated between the main planes of the machine supporting the opposite edges of said aileron, one of said frame pieces being formed with means slidably accommodating the edge supported thereby, and means flexibly connecting with the aileron to cause vertical distortion thereof in either direction from its neutral placement without altering the angle of incidence thereof.

23. In a flying machine, the combination with the main planes of the machine, of an aileron normally neutral as to its placement with respect to said main planes, frame pieces situated between the main planes of the machine supporting the opposite edges of said aileron, one of said frame pieces being formed with means slidably accommodating the edge supported thereby, and means flexibly connecting with the aileron to alter the camber thereof in either vertical direction from its neutral placement without altering the angle of incidence thereof.

24. In a flying machine, the combination with the main planes of the machine, of an aileron normally neutral as to its placement with respect to said main planes, frame pieces situated between the main planes of the machine supporting the opposite edges of said aileron, one of said frame pieces being formed with means slidably accommodating the edge supported thereby, and means flexibly connecting with the aileron to cause, by a pull in either vertical direction, the fore-and-aft edges of the aileron to approach in altering the neutral placement thereof without altering the angle of incidence thereof.

25. In a flying machine, an aerofoil, and a means to flex the aerofoil without vertically moving either the leading or the trailing edge thereof.

26. In a flying machine, an aerofoil, a means to distort the aerofoil, and a means to maintain the leading edge and the trailing edge of the aerofoil against vertical displacement during distortion that the angle of incidence thereof may remain unaltered.

27. In a flying machine, the combination with the main planes, of an aileron normally neutral as to its placement with respect to said main planes, and a means to flex the aileron without vertically moving either the leading or the trailing edge thereof with respect to the supporting planes.

28. In a flying machine, the combination with the supporting plane of the machine, of an aileron normally neutral as to its placement with respect to said supporting plane, and a means to flex the aileron without vertically moving either the leading or the trailing edge thereof with respect to said supporting plane.

29. In a flying machine, the combination with the supporting plane of the machine, of an aileron normally neutral as to its placement with respect to said supporting plane, and means to distort the aileron from its neutral placement without altering the angle between the chord of the aileron and its direction of translation through the air.

30. In a flying machine, the combination with the supporting plane of the machine, of an aileron normally neutral as to its placement with respect to said supporting plane, and means to vary the camber of the aileron without altering the angle between the chord thereof and the direction of its translation through the air.

In testimony whereof I affix my signature.

ALBERT F. ZAHM.